United States Patent [19]

Wenz

[11] 3,790,205

[45] Feb. 5, 1974

[54] TAKEOUT TONG ASSEMBLY
[76] Inventor: William Wenz, 427 Carton Ave., Millville, N.J. 08332
[22] Filed: Sept. 25, 1972
[21] Appl. No.: 291,735

[52] U.S. Cl............... 294/115, 294/87.24, 294/88, 294/118
[51] Int. Cl. ........................................... B66c 1/28
[58] Field of Search...... 294/16, 87 R, 87.22, 87.24, 294/88, 106, 115, 118; 198/210

[56] References Cited
UNITED STATES PATENTS

| 1,808,689 | 6/1931 | Stenhouse et al............... | 294/115 X |
| 2,685,880 | 8/1954 | Curutchet...................... | 294/106 X |
| 2,561,536 | 7/1951 | Rowe.............................. | 294/87 R |
| 3,549,191 | 12/1970 | Sarkozy et al. .................... | 294/81 R |
| 2,694,595 | 11/1954 | Garris................................. | 294/16 |

Primary Examiner—Evon C. Blunk
Assistant Examiner—Johnny D. Cherry
Attorney, Agent, or Firm—Charles F. Duffield

[57] ABSTRACT

Improvements to conventional apparatus commonly known as takeout tong holders for removing bottles and the like from glass molding machines. Conventional takeout tong holders include first and second opposed tong holders and tongs which are pivotly disposed on a common horizontal axis and actuated through arcuate paths between open and closed positions. The improvement includes alignment and stop blocks either formed integrally with or bolted to each of the tong holders midway of their length. The alignment and stop blocks project inwardly toward one another from the tong holders and are of a complementary configuration, one to another, and so dimensioned as to effect tong alignment during actuation of the tongs and also to provide a predetermined stop position for the tongs in closed position.

1 Claim, 6 Drawing Figures

PATENTED FEB 5 1974 3,790,205

TAKEOUT TONG ASSEMBLY

BACKGROUND OF INVENTION

The bottle molding industry has, for a number of years, been employing standard in line bottle forming machines. In such machines, the molten glass is injected into a mold at one station and the bottle blown into the mold as the forming takes place. After predetermined time, the mold opens and the bottle is then removed from the mold and placed into a conveyor for transportation to a processing station.

Such machines have universally employed what is generally known as the Hartford type of takeout tong assembly. This assembly, in addition to an actuating mechanism, employs a pair of oppositely disposed takeout tong holders and associated tongs. In operation, the takeout tongs are spread in an open position and moved to a pickup position above a bottle whereupon the tongs close loosely about the neck of the bottle to pick the bottle up and transport it to a conveyor.

The conventional takeout tong assembly limits the closed position of the tongs by means of either a stop associated with the actuating mechanism or by abutment of pickup blocks associated with the tongs. Pickup blocks are heat resistive material which are formed to the configuration of the particular bottle to be picked up and are attached to the lower extremities of the tongs. When the assembly moves to its closed position, the edges of the pickup blocks contact one another thus defining the maxium limit of closed travel of the tong assembly.

One of the inherent problems of the conventional tong assembly is misalignment of the tongs and closing of the tongs beyond the desired position. As the tong assembly is repeatedly used, the constant abutment of the pickup blocks or contact of the stop will cause wear and permit the tongs to close to a dimension less than that desired. Additionally, repeated use of the tong assembly will cause wear in the journals supporting the tong holders. As this occurs, lateral misalignment of the pickup blocks associated with the tongs will likewise occur.

The effect of excessive closing and lateral misalignment of the tong assembly is damage to the bottles being picked up. The bottles which the tong assembly is picking up have just passed from the mold assembly and are still quite hot and pliable. Accordingly, any misalignment of the tongs or excessive closing distance of the tongs will bruise or misform the particular portion of the bottle being picked up, which, in most instances, is in the upper extremities or neck thereof.

The resultant damage occurring to the bottles, of course, results in a higher reject of the bottles by the ultimate user. In some industries, such as medicine or food, the sealing portion of the bottle must be nearly perfect to withstand rejection due to the inherent danger of spoilage from an imperfect seal. Accordingly, it becomes extremely important that there be no distortion of the bottles during the takeout process.

OBJECTS AND SUMMARY OF INVENTION

It is the object of the present invention to provide improved alignment and stop means for controlling the movement of the takeout tongs of a tong head assembly.

The foregoing object is carried out be adding alignment and stop blocks to the tong holders of a conventional tong assembly. The takeout blocks may be formed integral with the tong holders or secured thereto. The alignment and stop blocks project from the tong holders toward each other and are of complementary configuration and so dimensioned as to provide tong alignment upon closing and a closed position stop.

In a specific embodiment, one of the blocks includes a parallel sided slot and a back wall. The second includes a parallel sided projection which is of a complementary width to the slot of the first block. The length of the projection of the second block is such that the end of the block will engage the back wall of the slot when the tongs have reached a predetermined closed position to provide the stop mechanism for the tongs. The length of the projection and that of the slot are such that the first and second blocks remain in contact with one another throughout the path of travel of the tongs between open and closed positions to maintain constant alignment of the tongs.

Other objects and advantages of the present invention will become apparent to those skilled in the art from the following detailed description thereof taken in conjunction with the drawings.

DETAILED DESCRIPTION OF INVENTION

Figure 1:
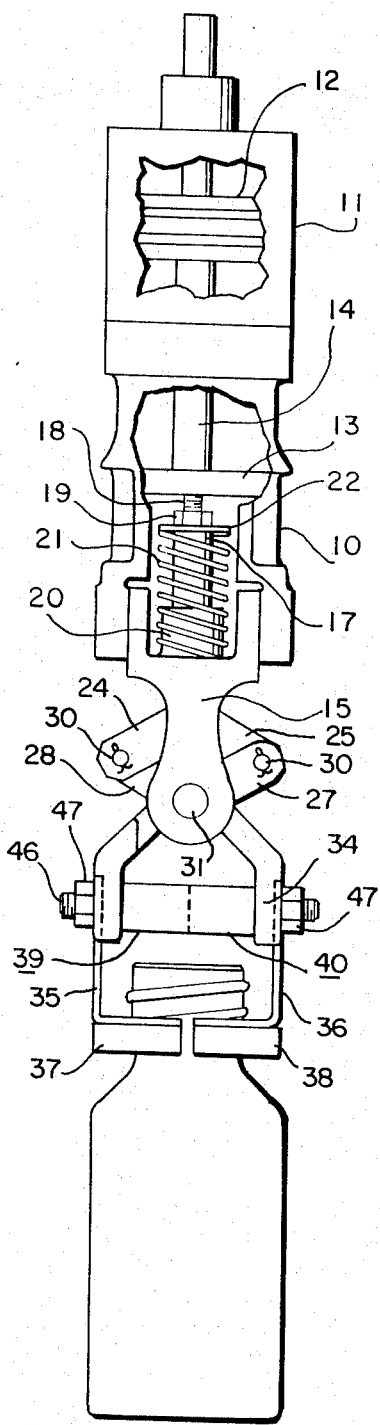
FIG. 1 is a side view of an entire takeout tong head assembly and included tongs utilizing the takeout and stop blocks of the present invention.
Figure 2:
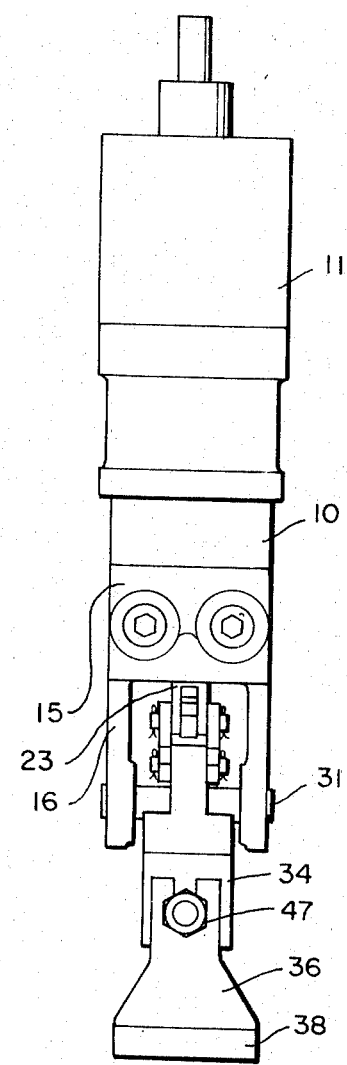
FIG. 2 is a further side view of the assembly of FIG. 1.

An entire takeout tong head assembly in which the improved stop and alignment blocks of the present invention are employed is shown in FIGS. 1 and 2. The assembly generally includes a cylinder body 10 and cylinder head 11. Disposed within the cylinder head 11 is a pneumatic piston 12 which actuates a connecting rod 14. The connecting rod 14, in turn, dirves a cross head 13 which reciprocates within guideways within the cylinder body 10.

A tong holder guide bracket 15 is secured to the lower portion of the cylinder body 10. As best shown in FIG. 2, the tong holder guide bracket includes a pair of parallel and downwardly extended arms 16 at the lower portion thereof. A central boss 20 in the center of the tong holder bracket provides a guideway for a plunger 17.

As best shown in FIG. 1, the upper end of the plunger 17 includes an adjusting screw and nut 18 and 19 respectively. The upper end of the adjusting screw 18 engages the under side of the cross head 13. A coil compression spring 21 is disposed around the plunger and seats at one end against the tong holder bracket and, at the other end, against a U 22 washer which is secured under the adjusting nut 19.

The lower end 23 of the plunger 17, as best shown in FIG. 2, extends through the guide 20 to a position between the extended arms 16 of the tong holder bracket. In operation, as air is applied to the upper portion of the piston 12, the piston will act through the connecting arm 11 and cross head 13 to extend the plunger downwardly through the guide 20. Upon the release of the air pressure in cylinder 12, the compression of the coil spring 21 will return the plunger upwardly in the guide and force the piston 12 to its initial position.

Figure 3:
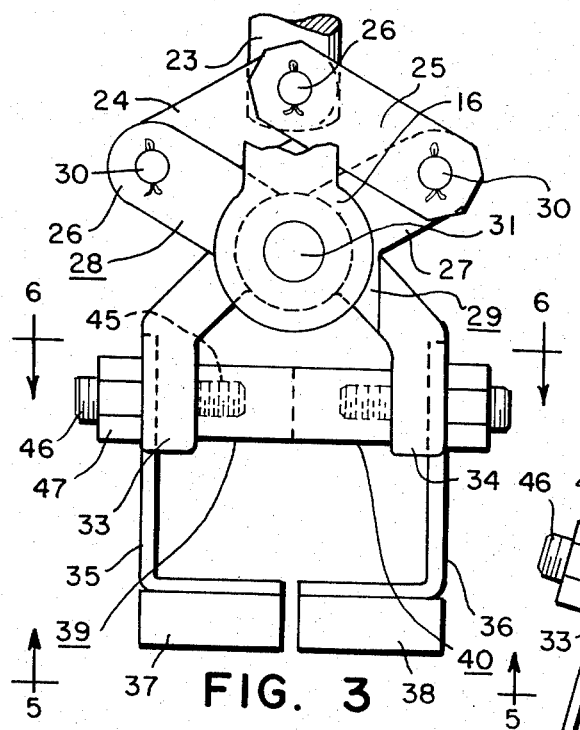
FIG. 3 is a detailed side view of the tong holders and associated stop and alignment blocks in closed position.
Figure 4:
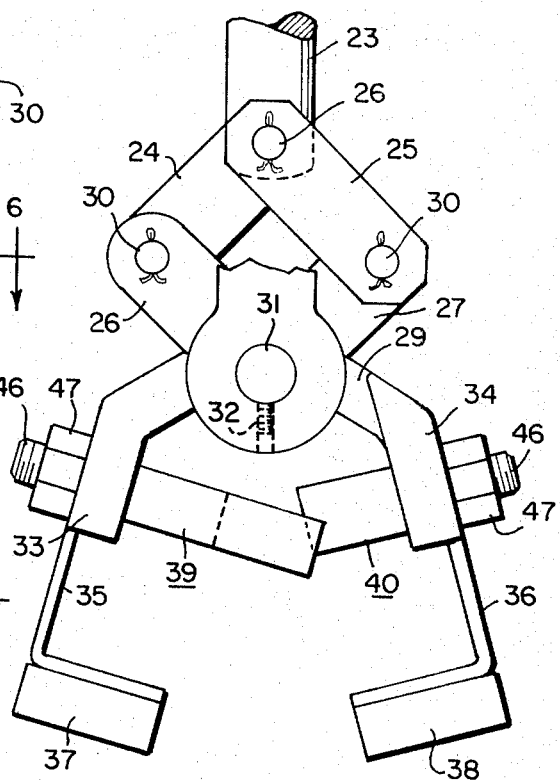
FIG. 4 is a further view of the tong holders of FIG. 3 in open position.

Referring more specifically now to FIGS. 2 – 4, the lower end of the plunger 23 drives actuating links 24 and 25. As may more specifically be seen in FIG. 2, there is a single actuating link 24 which is connected to the lower end of the plunger 23 through a slot in the end of the plunger. A pair of actuating links 25 are also provided which are disposed on either side of the link 24 and on the outside of the end of the plunger 23. A link pin 26 and associated cotter pins on either end thereof are employed to maintain the links in place.

The opposite ends of the single link 24 and pair of links 25 are connected to the upper arms 26 and 27 of a pair of tong holders 28 and 29. In a reverse manner and again as may be seen in more detail in FIG. 2, the upper portion of the arm 26 of tong holder 28 includes a slot therein to receive the single link 24. The upper arm 27 of the opposite tong holder 29 is a single arm and the pair of links 25 are disposed on either side of this arm. Link pins 30 and associated cotter pins retain the links 24 and 25 to the arms 26 and 27.

Each tong holder 28 and 29 includes an aperture through the central portion of the tong holder. The tong holders are journaled upon a wrist pin 31 which likewise journal in corresponding apertures of the lower extremities of the arms 16 of the tong holder bracket 15. As may be seen in FIG. 4, a set screw 32 retains the pivot pin 31 in place.

The lower ends 33 and 34 of the tong holders 28 and 29 respectively provide the support for a pair of tongs 35 and 36. Likewise, a pair of pickup blocks 37 and 38 are carried by the lower ends of the tongs 35 and 36 respectively.

As may be seen in FIG. 3, whenever the plunger makes a downward stroke, the action of the links 24 and 25 causes the upper arms of the tong holders to swing outwardly which, in turn, causes the lower arms thereof to close. In a reverse manner, and as shown in FIG. 4, whenever the plunger makes an upward stroke, the resultant action is to open the tongs and associated pickup blocks.

The conventional tong assembly adjust to the closed position in one of two ways. The first was merely to permit the pickup blocks to engage one another to establish the predetermined closed position. The second way is to adjust the adjusting screw and nut 18 and 19 under the cross head 13 to bring the closed position of the tongs to that desired. Lateral alignment of the tongs, one to another, is maintained in the conventional tong assembly only by the precision of the arms journaled upon the pivot pin. Continued use of the tong assembly will result in wear of the tong holders journaled upon the pivot pin thus causing lateral disalignment. In a like manner, use of the tong assembly will cause wear of the stop blocks and/or adjusting nut and screw likewise causing variations in the closed position of the tongs.

In accordance with the present invention, lateral misalignment and changes in the stop position are prevented. This is accomplished by employing two alignment and stop blocks 39 and 40 between the lower ends 33 and 34 of the tong holders 28 and 29 respectively. As may be seen in more detail in FIGS. 3 – 6, the first block 39 has a slot cut into the block. The slot employs parallel side walls 41 and 42 and terminates in a square back wall 43.

The second and opposite block 40 is of a complementary configuration with the slot in the first block 39. The block 40 essentially constitutes a projection which has, in a like manner, parallel sides and terminates in a square end. The sides are of a width to correspond with the width of the slot and capable of just passing between the side walls 41 and 42 of the first block 39.

Figure 5:
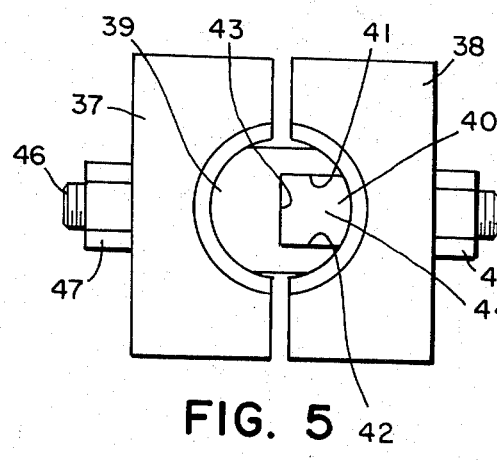
FIG. 5 is a bottom view of the tong holders along the lines of 5—5 of FIG. 3.
Figure 6:
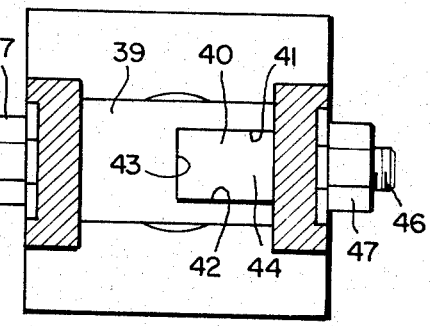
FIG. 6 is a top sectional view of the tong holders taken along the lines 6—6 of FIG. 3.

The length of the projection 44 of the stop block 40 and the depth of the slot in stop block 39 are so adjusted that the blocks come into complete complementary engagement at a predetermined closed position of the tongs as shown in FIGS. 3, 5 and 6. Additionally, the depth of the slot and length of the projection of the first and second blocks accordingly are so dimensioned that the side walls of the blocks remain in engagement throughout the entire path of travel of the tongs between open and closed positions, as shown in FIG. 4. In this manner, constant lateral alignment of the tongs, one to another, is maintained. In this manner, the stop and alignment blocks of the present invention maintain accurate lateral alignment and stop position of the tong holders.

The stop blocks may also be so dimensioned that the tongs close to a predetermined gap, i.e., 0.010 inches. As the tongs are used, this gap can be measured to determine tong wear.

The stop and alignment blocks 39 and 40 may be cast integrally with the tong holders 28 and 29 at the time of manufacture. Additionally, for those machines which are already in operation, the tong holders can be retrofitted with the stop and alignment blocks which have been manufactured separately. In the conventional tong assembly, the tongs 35 and 36 are secured to the lower ends of the tong holders 33 and 34 by means of a cap screw which passes through an aperture in the tong 35 and is threaded into a threaded boss in the tong holder.

Where retrofit has been accomplished, the stop and alignment blocks are manufactured as separate units and include a threaded aperture 45 in each end thereof opposite the slot and projection. The conventional cap screw is removed and a threaded stud 46 of a diameter lesser than the threaded boss is inserted through the boss and screwed into the tapped recess 45. A nut 47 is then engaged upon the threaded stud 46 to securely clamp the tong to the tong holder and secure the stop and alignment blocks in place.

The foregoing invention has been described in respect to particular embodiments thereof shown in the drawings. However, other modifications and advantages of the present invention will become apparent to those skilled in the art as a result of the foregoing disclosure and, accordingly, no limitation as to the scope of the invention is intended by the particular embodiments as shown and described.

I claim:

1. In apparatus for removing bottles and the like from a forming machine including first and second opposed tong holders and tongs pivotly disposed upon a common horizontal axis and actuated through opposite arcuate paths between open and closed positions, the improvement of alignment and stop means for the tong holders comprising a first alignment and stop block projecting inwardly from one of the tong holders toward the second tong holder and a second alignment and stop block projecting from the second tong holder toward the first block, The first block including a longitudinal slot therein forming a back wall and parallel side walls and the second block including a projection therefrom forming parallel side walls of width complementary to the slot of the first block and of length to engage the back wall of the first block at a predetermined closed position of the tongs thus providing lateral alignment and closed positioning; and The thickness of the first and second blocks and the depth of the notch and length of the projection of the first and second blocks respectively being so dimensioned as to maintain continuous side wall engagement and consequent alignment of the blocks throughout the tongs' path of travel between fully opened and closed positions.

* * * * *